US008917352B2

(12) United States Patent
Okano et al.

(10) Patent No.: US 8,917,352 B2

(45) Date of Patent: Dec. 23, 2014

(54) LENS FRAME DRIVE APPARATUS FOR IMAGE PICKUP APPARATUS

(71) Applicant: Olympus Imaging Corp., Tokyo (JP)

(72) Inventors: Koji Okano, Hachioji (JP); Junya Harada, Hachioji (JP); Kazuhiro Morisaki, Yokohama (JP)

(73) Assignee: Olympus Imaging Corp., Tokyo (JP)

( * ) Notice: Subject to any disclaimer, the term of this patent is extended or adjusted under 35 U.S.C. 154(b) by 1 day.

(21) Appl. No.: 13/875,121

(22) Filed: May 1, 2013

(65) Prior Publication Data

US 2013/0300922 A1 Nov. 14, 2013

(30) Foreign Application Priority Data

May 11, 2012 (JP) ................................ 2012-109805

(51) Int. Cl.

| | |
|---|---|
| ***H04N 5/225*** | (2006.01) |
| ***H04N 5/232*** | (2006.01) |
| ***H04N 5/262*** | (2006.01) |
| ***G03B 5/02*** | (2006.01) |
| ***G02B 7/08*** | (2006.01) |
| ***G03B 3/10*** | (2006.01) |

(52) U.S. Cl.

CPC ................ *H04N 5/2254* (2013.01); *G03B 5/02* (2013.01); *G02B 7/08* (2013.01); *G03B 3/10* (2013.01); *G03B 2205/0053* (2013.01)

USPC ......................... 348/374; 348/345; 348/240.3

(58) Field of Classification Search

CPC .................................................. H04N 5/2252

USPC ......................................................... 348/374

See application file for complete search history.

(56) References Cited

U.S. PATENT DOCUMENTS

| | | | | |
|---|---|---|---|---|
| 6,327,438 | B1 * | 12/2001 | Tatamiya | 396/315 |
| 7,295,390 | B2 * | 11/2007 | Miki | 359/824 |
| 7,403,342 | B2 | 7/2008 | Sasaki | |
| 2005/0169622 | A1 * | 8/2005 | Uemura et al. | 396/72 |
| 2006/0221466 | A1 * | 10/2006 | Yamane | 359/700 |
| 2008/0316322 | A1 * | 12/2008 | Eromaki | 348/208.5 |

FOREIGN PATENT DOCUMENTS

| | | | |
|---|---|---|---|
| JP | 04-317015 | A | 11/1992 |
| JP | 2521866 | Y2 | 1/1997 |
| JP | 2007-114707 | A | 5/2007 |

* cited by examiner

*Primary Examiner* — Nhan T Tran

*Assistant Examiner* — Chan Nguyen

(74) *Attorney, Agent, or Firm* — Holtz, Holtz, Goodman & Chick PC

(57) ABSTRACT

A lens frame drive apparatus for an image pickup apparatus includes: a first lens frame that moves along a plurality of guide shafts; a second lens frame that moves along the plurality of guide shafts; and a drive shaft with a cam portion for driving the first lens frame, a nut for driving the second lens frame, a feed screw portion threadably connected to the nut, and a driven portion that upon receipt of a driving force from a motor, simultaneously rotates the cam portion and the feed screw portion, formed thereon, wherein the cam portion and the feed screw portion are driven by the nut so that a total amount of movement of the second lens frame is extremely smaller than a total amount of movement of the first lens frame and the second lens frame corrects the amount of movement of the first lens frame.

5 Claims, 3 Drawing Sheets

| IMAGE HEIGHT RATIO | 0 | 0.2 | 0.35 | 0.45 |
|---|---|---|---|---|
| Z1 S | 0.000 | −0.007 | 0.002 | 0.021 |
| Z1 M | 0.000 | −0.001 | 0.019 | 0.030 |
| Z2 S | 0.000 | −0.010 | −0.007 | 0.010 |
| Z2 M | 0.000 | −0.007 | 0.015 | 0.032 |
| Z3 S | 0.000 | −0.005 | 0.009 | 0.030 |
| Z3 M | 0.000 | −0.006 | 0.040 | 0.054 |

| IMAGE HEIGHT RATIO | 0 | 0.2 | 0.35 | 0.45 |
|---|---|---|---|---|
| Z1 S | 0.000 | −0.009 | −0.004 | 0.012 |
| Z1 M | 0.000 | −0.007 | 0.001 | 0.001 |
| Z2 S | 0.000 | −0.011 | −0.012 | 0.002 |
| Z2 M | 0.000 | −0.012 | −0.002 | 0.007 |
| Z3 S | 0.000 | −0.008 | −0.002 | 0.013 |
| Z3 M | 0.000 | −0.004 | 0.005 | 0.004 |

LENS FRAME DRIVE APPARATUS FOR IMAGE PICKUP APPARATUS

CROSS-REFERENCE TO RELATED APPLICATION

This application claims the benefit of Japanese Application No. 2012-109805 filed in Japan on May 11, 2012, the contents of which are incorporated herein by this reference.

BACKGROUND OF THE INVENTION

1. Field of the Invention

The present invention relates to a lens frame drive apparatus for an image pickup apparatus that individually drives a plurality of lens frames holding a plurality of lens groups, respectively, inside a photographing optical system in an image pickup apparatus.

2. Description of Related Art

In a lens frame drive apparatus for a conventional image pickup apparatus, when, e.g., a zooming or focusing operation is performed, it is necessary to move a plurality of lens groups in an optical axis direction, respectively, by different amounts of movement. Therefore, in addition to, for example, drive mechanisms with drive sources dedicated to zooming and focusing, respectively, various drive mechanisms in which two types of cams/threads are formed at one drive shaft and such drive shaft is driven to rotate by one drive source, thereby providing an operation similar to the above, have been proposed in, for example, Japanese Examined Utility Model Registration No. 2521866 and Japanese Patent Application Laid-Open Publication No. 4-317015 and put into practical use.

The lens frame drive apparatus for an image pickup apparatus disclosed in Japanese Utility Model Laid-Open No. 2521866 is configured so that a first feed screw and a second feed screw are integrally formed and a first group moving frame is moved by the first feed screw and a second group moving frame is moved by the second feed screw by means of a driving force of a drive source, respectively, in the optical axis direction by different amounts of movement. Furthermore, the second feed screw is configured so as to move in the optical axis direction via a cam rotated by the driving force of the drive source.

The lens frame drive apparatus for an image pickup apparatus disclosed in Japanese Patent Application Laid-Open Publication No. 4-317015 is configured so that a drive ring for both focusing and zooming and a drive ring for zooming are joined to each other via clutch means and, during idling of the clutch means, only the drive ring for both focusing and zooming is rotated to perform focusing and during the clutch means being engaged, both the drive ring for focusing and zooming and the drive ring for zooming are rotated to perform zooming.

SUMMARY OF THE INVENTION

A lens frame drive apparatus for an image pickup apparatus according to an aspect of the present invention includes: a first lens frame that moves along a plurality of guide shafts; a second lens frame that moves along the plurality of guide shafts; and a drive shaft with a cam means for driving the first lens frame, a nut for driving the second lens frame, feed screw means threadably connected to the nut, and a driven portion that upon receipt of a driving force from a motor, simultaneously rotates the cam means and the feed screw means, formed thereon, wherein the cam means and the feed screw means are driven by the nut threadably connected to the feed screw means so that a total amount of movement of the second lens frame is extremely smaller than a total amount of movement of the first lens frame and the second lens frame corrects the amount of movement of the first lens frame.

Benefits of the present invention will further be clarified from the following detailed description.

DETAILED DESCRIPTION OF THE PREFERRED EMBODIMENTS

The present invention will be described below by an illustrated embodiment.

A lens frame drive apparatus for an image pickup apparatus according to the present invention may be applied to, for example, an image pickup apparatus (hereinafter simply referred to as camera) configured to photoelectrically convert an optical image formed by a photographing optical system using a solid-state image pickup device so that a resulting image signal can be recorded in a recording medium as a digital data representing a still image or a moving image and the still image or the moving image can be reproduced and displayed on a display apparatus based on the digital image data recorded in the recording medium.

An embodiment of the present invention, which will be described below, indicates an example where the present invention is applied to a lens frame drive apparatus for individually driving at least two movable lens frames disposed so as to be movable in the optical axis direction from among a plurality of lens frames holding a plurality of lens groups, respectively, in a photographing optical system in an image pickup apparatus (camera).

Figure 1:
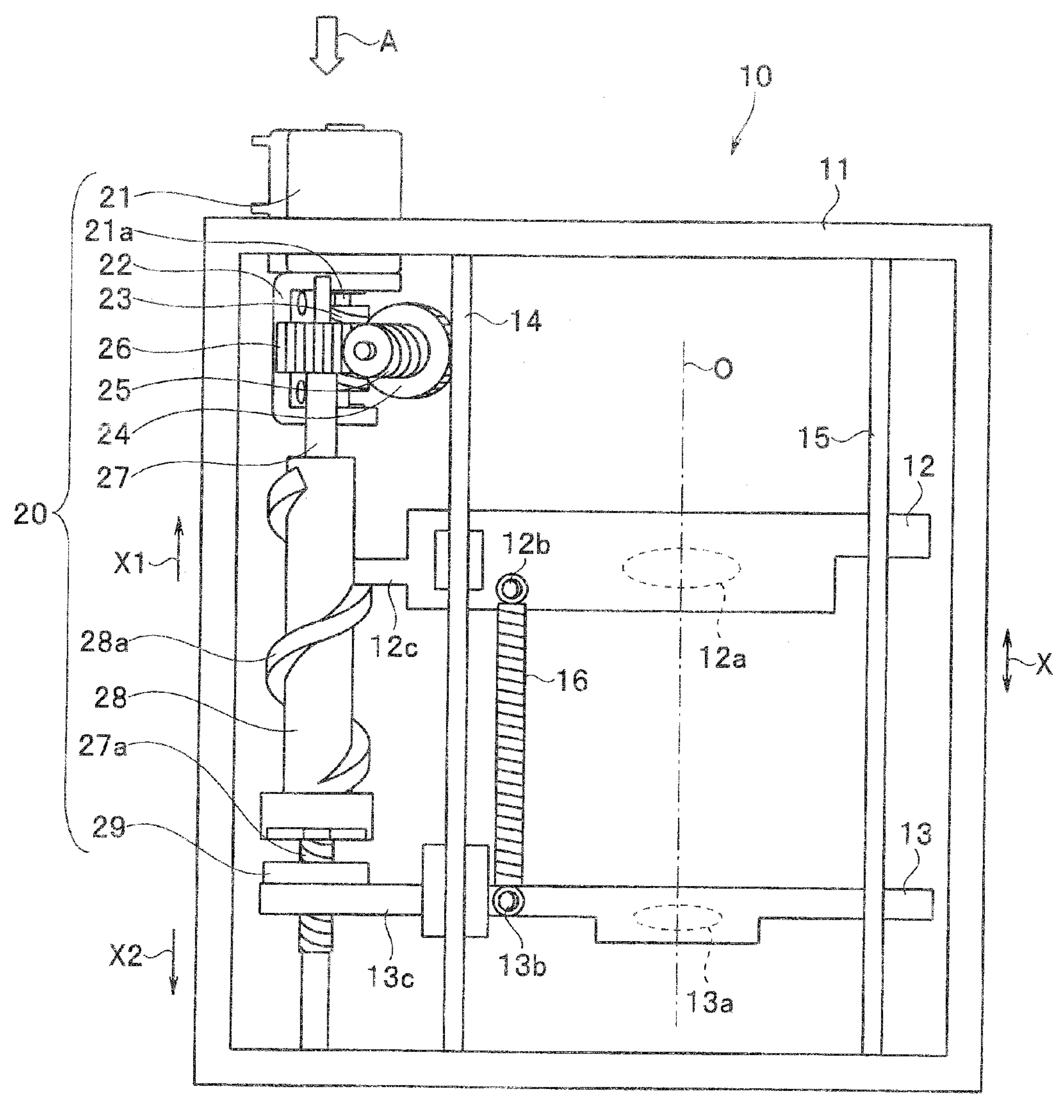
FIG. 1 is a schematic diagram of a configuration of a lens frame drive apparatus for an image pickup apparatus according to an embodiment of the present invention.

FIG. 1 is a diagram illustrating a schematic configuration of a lens frame drive apparatus for an image pickup apparatus according to an embodiment of the present invention. As illustrated in FIG. 1, a lens frame drive apparatus 20 for an image pickup apparatus according to the present embodiment is mounted in a lens barrel 10 of the image pickup apparatus and forms a part thereof. More specifically, the lens frame drive apparatus 20 is a drive apparatus provided to individually move two lens frames (12 and 13) that hold two lens groups, respectively, in a photographing optical system in the lens barrel 10 in the direction along an optical axis O of the photographing optical system, which is the direction indicated by arrow X in FIG. 1.

Here, the lens barrel 10 of the image pickup apparatus includes, e.g., a fixed frame 11, a photographing optical system including a plurality of lens groups (12*a* and 13*a*), a plurality of lens frames (12 and 13) holding the lens groups (12*a* and 13*a*), respectively, a plurality of guide shafts (14 and 15) supporting the plurality of lens frames (12 and 13) so as to be movable in the direction along the optical axis O (arrow X direction), and the lens frame drive apparatus 20. Note that FIG. 1 relates to a configuration of the lens barrel 10 itself, and only members that are related to the description of the present invention are illustrated in a simplified manner; members not related to description of the present invention are not illustrated.

The fixed frame 11 is a basic housing of the lens barrel 10. In an inner portion of the fixed frame 11, various types of members forming the lens barrel 10 are disposed at respective predetermined positions.

As described above, the photographing optical system in the lens barrel 10 includes a plurality of lens groups. Among the plurality of lens groups, in FIG. 1, only two lens groups (12*a* and 13*a*), which are movable lenses, are illustrated. Here, from among the two lens groups, which are movable lenses, a first lens group 12*a* is, for example, a lens group that mainly contributes to zooming. The first lens group 12*a* is held by the first lens frame 12.

On the other hand, the second lens group 13*a* is a lens group that assists zooming by moving in conjunction with the first lens group 12*a*. Also, the second lens group 13*a* is a lens group for correcting a variation (deviation) in optical performance resulting from, e.g., an error that occurred during manufacture of optical lenses included in the photographing optical system. The second lens group 13*a* is held by the second lens frame 13.

The plurality of lens frames (12 and 13) are frame-shaped or barrel-shaped members that hold the plurality of lens groups (12*a* and 13*a*), respectively, in the photographing optical system. Among the lens groups, the first lens frame 12 holds the first lens group 12*a* and the second lens frame 13 holds the second lens group 13*a*, respectively. The first lens frame 12 and the second lens frame 13 are supported by the plurality of guide shafts (14 and 15) so as to be movable along the optical axis O direction (arrow X direction). That is, the first lens frame 12 and the second lens frame 13 are frame members that move along the plurality of guide shafts (14 and 15).

Among the plurality of guide shafts (14 and 15), the first guide shaft 14 is a main guide shaft that supports the plurality of lens frames (12 and 13) so as to be movable in the direction along the optical axis O (arrow X direction). Also, the second guide shaft 15 is a sub-guide shaft that, as with the main guide shaft (first guide shaft 14), supports the plurality of lens frames (12 and 13) so as to be movable in the direction along the optical axis O (arrow X direction) and restricts the plurality of lens frames (12 and 13) from pivoting with reference to the first guide shaft 14.

Between a fixed portion 12*b* of the first lens frame 12 and a fixed portion 13*b* of the second lens frame 13, a contractible biasing member 16 including, for example, a coil spring is bridged. The biasing member 16 is biased in a direction in which both frames 12 and 13 consistently pull each other.

Also, an arm portion 12*c* extending in a direction orthogonal to the optical axis O is formed at an end portion of the first lens frame 12. Likewise, an arm portion 13*c* extending in the direction orthogonal to the optical axis O is formed at an end portion of the second lens frame 13. The arm portion 12*c* abuts against a rib cam portion 28*a* of a barrel cam 28 in a lens frame drive apparatus 20, which will be described later, and the arm portion 13*c* engages with a drive nut 29 in the later-described lens frame drive apparatus 20. With such configuration, each of the frames 12 and 13 is arranged at a predetermined position against the biasing force of the biasing member 16 and thereby positioned.

The lens frame drive apparatus 20 includes, e.g., a motor 21, a motor bracket 22, a worm gear 23, a double gear including a wheel gear 24 and a small gear 25, a drive gear 26, a drive shaft 27, a barrel cam 28, which is cam means, and a drive nut 29.

The motor 21 is a drive source of the lens frame drive apparatus 20. For the motor 21, for example, a stepping motor is employed. One end of the motor bracket 22 is fixed to one end of the motor 21. The motor bracket 22 is a support bracket formed so as to have a substantially channel-like shape in cross section. A motor rotating shaft 21*a* of the motor 21 is inserted between the end and the other end of the motor bracket 22, and at the other end, the motor rotating shaft 21*a* is pivotably supported. Note that a worm gear 23 is fixed to the motor rotating shaft 21*a* of the motor 21.

The worm gear 23 is threadably connected to the wheel gear 24 of the double gear. The double gear is supported so as to be pivotable relative to a fixed portion (not illustrated) of the fixed frame 11. The small gear 25 of the double gear is threadably connected to the drive gear 26.

The drive shaft 27 mainly includes, e.g., the barrel cam 28 (cam means), the drive nut 29 and a helical thread portion 27*a* (feed screw means) and a drive gear 26 (driven portion).

The drive shaft 27 is supported so as to be pivotable relative to the fixed portion of the fixed frame 11. The drive gear 26 is fixed at a position in the vicinity of an end portion of the drive shaft 27 close to the motor 21, coaxially with the drive shaft 27. The drive gear 26 is a driven portion for upon receipt of a driving force from the motor 21, simultaneously rotating the cam means (28) and the feed screw means (27*a*).

On the other hand, at a part of the drive shaft 27 close to the other end thereof, the helical thread portion 27*a* is formed. The drive nut 29 is threadably connected to the helical thread portion 27*a*. The drive nut 29 is a drive member for driving the second lens frame 13. The drive nut 29 is restricted from rotation relative to the fixed frame 11 in a state in which the drive nut 29 is threadably connected to the helical thread portion 27*a*, and is disposed at a predetermined position of the fixed frame 11 so as to be movable in the direction along the optical axis O (arrow X direction). Also, the helical thread portion 27*a* is feed screw means threadably connected to the drive nut 29. Note that in this case, the helical thread portion 27*a* is formed so as to have a helical shape extending downward in a clockwise direction, for example, viewed from the upper side in FIG. 1 (side indicated by arrow A). The arm portion 13*c* of the second lens frame 13 engages with the drive nut 29.

Also, the drive shaft 27 is inserted through the barrel cam 28. In such case, the barrel cam 28 is fixed at a predetermined position in a substantially middle part of the drive shaft 27. The barrel cam 28 is cam means for driving the first lens frame 12. The barrel cam 28 is a cylindrical rib cam member including a helical rib cam portion 28*a* on a cylindrical outer circumferential face thereof. The rib cam portion 28*a* of the barrel cam 28 is formed so as to have a helical shape extending upward in a counterclockwise direction, for example, viewed from the upper side in FIG. 1 (side indicated by arrow A). The arm portion 12*c* of the first lens frame 12 abuts against the rib cam portion 28*a* of the barrel cam 28.

Note that the barrel cam 28 is fixed to the drive shaft 27 using, for example, an adhesive. Here, relative positions of the barrel cam 28 and the helical thread portion 27*a* are adjusted and set for the respective products during manufacture of lens barrels 10 to which the lens frame drive apparatus 20 is applied. In this case, relative position setting of the barrel cam 28 and the helical thread portion 27*a* is equivalent to relative positioning of the two lens frames 12 and 13. In other words, when the relative positions of the two lens groups 12*a* and 13*a* held by the two lens frames 12 and 13, respectively, are set, the optical correction, for example, a correction of an amount of curvature of field, of the photographing optical system in the lens barrel 10 including these two lens groups 12*a* and 13*a* is performed.

With such configuration, the lens frame drive apparatus 20 according to the present embodiment enables the first lens frame 2 to move in the optical axis O direction by means of the barrel cam 28 and also the second lens frame 13 to move in the optical axis O direction by means of the drive nut 29. In this case, amounts of movement of the first lens frame 12 and the second lens frame 13 are set so that the amount of movement of the second lens frame 13 (movement by means of the feed screw) is extremely smaller than the amount of movement of the first lens frame 12 (movement by means of the cam). That is, a thread pitch of the helical thread portion 27*a*, which is feed screw means, is set to be sufficiently small relative to a cam width (width of a cam follower) of a rib cam portion 28*a* of the barrel cam 28, which is cam means.

Also, when the drive shaft 27 pivots upon receipt of a rotation driving force of the motor 21, if, for example, the first lens frame 12 moves in the arrow X1 direction in FIG. 1, the second lens frame 13 moves in the arrow X2 direction in FIG. 1. That is the helix direction (rotation direction) of the rib cam portion 28*a* of the barrel cam 28 and the helix direction (rotation direction) of the helical thread portion 27*a* are set to be opposite to each other in phase.

An operation of the lens barrel 10 to which the lens frame drive apparatus 20 according to the present embodiment configured as described above is applied will briefly be described below.

First, in the lens frame drive apparatus 20, when the motor 21 is driven to rotate in a predetermined direction, the motor rotating shaft 21*a* and the worm gear 23 start rotating in the same direction. The worm gear 23 makes the double gear (the wheel gear 24 and the small gear 25) pivot in a predetermined direction and the double gear make the drive gear 26 rotate in a predetermined direction. Consequently, the drive shaft 27 and the barrel cam 28 simultaneously start rotating in a predetermined direction. Here, it is assumed that the first lens frame 12 abutting against the rib cam portion 28*a* of the barrel cam 28 moves against the biasing force of the biasing member 16, for example, in the arrow X1 direction in FIG. 1. Then, the second lens frame 13 is pressed by the drive nut 29 and thereby slightly moves in the arrow X2 direction in FIG. 1.

When the lens frame drive apparatus 20 according to the present embodiment is assembled with the drive shaft 27 including the helical thread portion 27*a* and the barrel cam 28 including the rib cam portion 28*a* formed by separate members, the barrel cam 28 is fixed to the drive shaft 27, enabling the drive shaft 27 and the barrel cam 28 to coaxially rotate.

Accordingly, during manufacture of the lens barrel 10 to which the lens frame drive apparatus 20 is applied, a position where the barrel cam 28 is fixed relative to the drive shaft 27 is adjusted, enabling an adjustment to be made so that proper relative positions of the rib cam portion 28*a* of the barrel cam 28 and the helical thread portion 27*a* are provided for respective products.

A lens frame drive apparatus according to the present embodiment that enables an adjustment such as described above can provide effects indicated below.

Figures 2, 3:
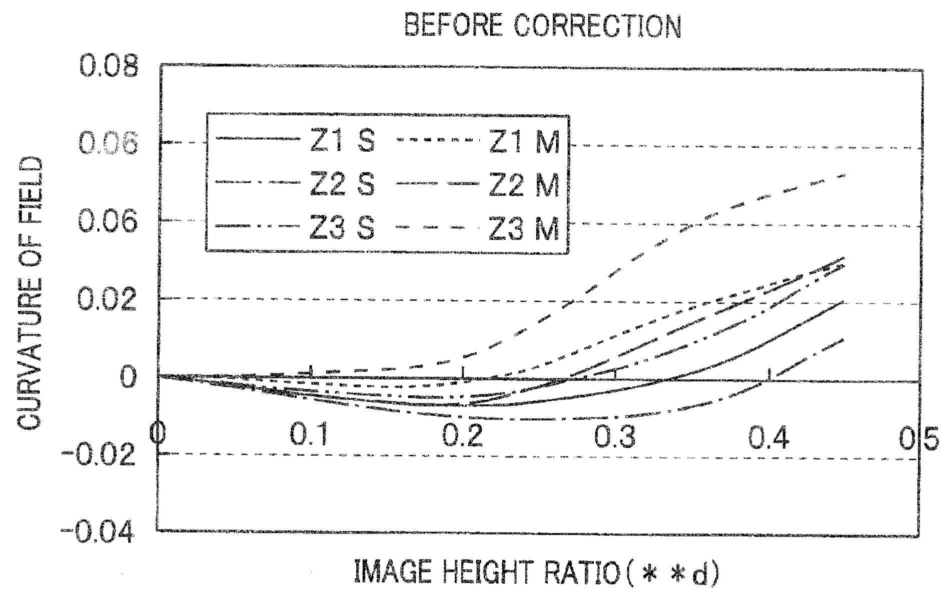
FIG. 2 is a graph illustrating amounts of curvature of field before an optical correction in a lens frame drive apparatus for an image pickup apparatus according to an embodiment of the present invention.
FIG. 3 is a data table of amounts of curvature of field corresponding to the graph in FIG. 2.
Figures 4, 5:
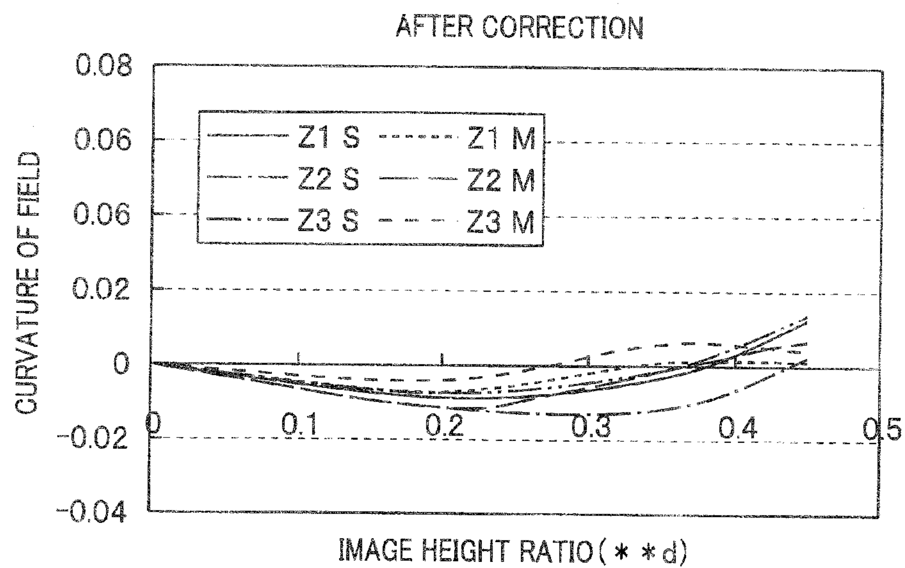
FIG. 4 is a graph illustrating amounts of curvature of field after the optical correction in a lens frame drive apparatus for an image pickup apparatus according to an embodiment of the present invention.
FIG. 5 is a data table of amounts of curvature of field corresponding to the graph in FIG. 4.

FIGS. 2 to 5 illustrate data for amounts of curvature of field before and after the optical correction performed in a lens frame drive apparatus according to an embodiment of the present invention. Among the Figures, FIGS. 2 and 3 indicate data before the optical correction, and FIGS. 4 and 5 indicate data after the optical correction. Note that in FIGS. 2 to 5, symbol Zx (x=1, 2, 3) indicates a zoom position, and symbol S and symbol M following that symbol indicate a sagittal plane and a meridional plane, respectively. In FIGS. 3 and 5, the abscissa axis is the image height ratio and the ordinate axis is the amount of curvature of field.

Here, in the lens barrel 10 according to the present embodiment to which the lens frame drive apparatus 20 is applied, as described above, among the movable frames (12 and 13), the first lens frame 12 holds the first lens group 12*a* that mainly contributes to zooming. An amount of movement of the first lens frame 12 is set so as to be larger than an amount of movement of the second lens frame 13.

On the other hand, the second lens frame 13 holds the second lens group 13*a*, which is a lens group that moves in conjunction with the first lens group 12*a* to assist zooming. Note that the second lens group 13*a* is also a lens group for correcting a variation (deviation) in optical performance of the photographing optical system. The amount of movement of the second lens frame 13 is set to be extremely smaller than that of the first lens frame 12.

For an example of the amounts of movement of the two movable frames (12 and 13), the amount of movement of the first lens frame 12 during zooming is approximately 17 mm. On the other hand, the amount of movement of the second lens frame 13 is approximately 1 mm, and around 0.5 mm thereof is used for optical performance correction.

A correction in the optical performance of the photographing optical system in the lens barrel 10 is performed by adjusting the relative distance between the two movable frames (12 and 13). For that purpose, for example, there are the following correction means:

(1) Adjusting a setting of an initial position the drive nut 29 that drives the second lens frame 13 in a thrust direction; and (2) Adjusting shapes for positioning in a rotation direction of each of the rib cam portion 28*a* of the barrel cam 28 that drives the first lens frame 12 and the helical thread portion 27*a* of the drive shaft 27 that drives the second lens frame 13. That is, there is correction means of adjusting phases in the rotation direction of the rib cam portion 28*a* and the helical thread portion 27*a*.

Here, in the optical performance of the photographing optical system of the lens barrel 10, for example, a curvature of field occurs due to, e.g., a manufacture error in thickness of optical lenses in the first lens group 12*a*. More specifically, it is assumed that, for example, the first lens group 12*a* includes a plurality of (for example three) optical lenses, and from among the plurality of optical lenses, two form a combined lens. In this case, it is contemplated that a manufacturing error of 0.02 mm occurs in the two optical lenses in the first lens group 12*a* including the three lenses.

In a lens barrel including such photographing optical system, changes in amount of curvature of field before and after an optical correction are indicated by the data in FIGS. 2 to 5, and a large effect is provided in correction of the amount of curvature of field, especially on the telephoto (TELE) side.

As described above, according to the above-described embodiment, the lens frame drive apparatus 20 includes the two lens frames (12 and 13) that move along a plurality of guide shafts (14 and 15), and also includes the drive shaft 27 with the cam means 28 for driving the first lens frame 12, the drive nut 29 for driving the second lens frame 13 and the helical thread portion 27*a* (feed screw means) of the drive shaft 27, the helical thread portion 27*a* being threadably connected to the drive out 29, and the drive gear 26 (drive gear 26, which is a driven portion) that upon receipt of a driving force from the motor 21, simultaneously rotating the barrel cam 28 (cam means and the feed screw means.

The rib cam portion 28*a* (cam means) of the barrel cam 28 and the helical thread portion 27*a* (feed screw means) of the drive shaft 27 are configured so that a total amount of movement of the second lens frame 13 is extremely smaller than a total amount of movement of the first lens frame 12 in the direction along the optical axis O and the second lens frame 13 is moved by the drive nut 29 so as to correct the amount of movement of the first lens frame 12.

With such configuration, in the lens frame drive apparatus for an image pickup apparatus according to the present embodiment, one drive shaft 27 is driven to rotate by a driving force of the motor 21, whereby at least two frame members (12 and 13) can be moved in the optical axis direction by different amounts of movement, respectively. In such case, where a difference in total amount of movement between the two frame members (12 and 13) is substantially large, also, the two movable frames (12 and 13) with largely-different amounts of movement can be moved efficiently by a driving force of one motor 21 only without an increase in size of the rib cam portion 28*a* of the barrel cam 28 and also without excessive load being imposed on the motor 21, i.e., an increase in rotation amount of the motor 21. Simultaneously with this, optical performance of the photographing optical system resulting from, e.g., a manufacturing error can be easily corrected when making adjustments during manufacturing.

Furthermore, since an image plane fluctuation sensitivity is provided by slight driving of the second lens group 13*a*, which is effective in reduction in size as the total optical length. Furthermore, as a result of the second lens group 13*a* being driven slightly, an image plane position can be made to be movable to the close-up side in a microphotographic mode. Accordingly, effects of enabling enlargement in macrophotographic range and enlargement in macrophotographic unit magnification range are provided.

Note that although the lens frame drive apparatus 20 according to the above-described embodiment is configured so that, e.g., a plurality of gears, that is, the worm gear 23, the double gear (24 and 25) and the drive gear 26, which is a driven portion, are provided on a driving force transmission pathway for transmitting a driving force from the motor 21 to the drive shaft 27, the present invention is not limited to such configuration. As another mode, for example, a motor rotating shaft 21*a* of a motor 21 and a drive shaft 27 may be arranged so as to correspond to each other.

It should be understood that the present invention is not limited to the above-described embodiment and various modifications and applications are possible without departing from the spirit of the invention. Furthermore, the above-described embodiment contains inventions of various phases and by a proper combination of the disclosed elements, various inventions may be extracted. For example, even if some elements are deleted from all the elements indicated by the embodiment, a configuration with the elements deleted can be extracted as an invention if such configuration can solve the problem to be solved by the invention and provides the effects of the invention. The present invention is not restricted by particular embodiments except that the present invention is limited by the attached claims.

The present invention is applicable not only to image pickup apparatuses such as digital cameras, which are electronic devices including a lens frame drive apparatus that has a shooting function and performs, e.g., zooming and focusing, but also to electronic devices of the other modes, for example, various types of electronic devices having a shooting function and including a lens frame drive apparatus, for example, mobile phones, sound recording devices, electronic organizers, personal computers, video-game consoles, televisions, clocks and navigational device using a GPS (global positioning system).

Furthermore, the present invention is applicable also to optical instruments for observation such as telescopes, binoculars and microscopes among electronic devices having an image pickup function that obtains an image using an image pickup device and including a lens frame drive apparatus that performs, e.g., zooming and focusing.

What is claimed is:

1. A lens frame drive apparatus for an image pickup apparatus, the lens frame drive apparatus comprising:

a first lens frame that moves along a plurality of guide shafts;

a second lens frame that moves along the plurality of guide shafts; and a drive shaft provided with cam means for driving the first lens frame, a nut for driving the second lens frame, feed screw means threadably connected to the nut, and a driven portion that, upon receipt of a driving force from a motor, simultaneously rotates the cam means and the feed screw means, which are formed on the drive shaft, wherein the cam means and the feed screw means are configured such that when the cam means and the feed screw means are simultaneously rotated, a total amount of movement of the second lens frame is smaller than a total amount of movement of the first lens frame, and the second lens frame is driven by the nut threadably connected to the feed screw means so as to correct the amount of movement of the first lens frame.

2. The lens frame drive apparatus for an image pickup apparatus according to claim 1, wherein a rotating shaft of the motor is arranged so as to correspond to the drive shaft.

3. The lens frame drive apparatus for an image pickup apparatus according to claim 1, wherein a thread pitch of the feed screw means is smaller than a width of a cam follower for the cam means.

4. The lens frame drive apparatus for an image pickup apparatus according to claim 1, wherein a direction of rotation of the cam means and a direction of rotation of the feed screw means are opposite to each other in phase.

5. The lens frame drive apparatus for an image pickup apparatus according to claim 1, wherein in the drive shaft, a part including the cam means and a part including the feed screw means are formed by separate members.

* * * * *